US011803831B1

(12) United States Patent
Kalaboukis

(10) Patent No.: US 11,803,831 B1
(45) Date of Patent: Oct. 31, 2023

(54) SYSTEMS AND METHODS FOR UTILIZING A USER EXPRESSION MAP CONFIGURED TO ENABLE CONTACTLESS HUMAN TO DEVICE INTERACTIONS

(71) Applicant: Wells Fargo Bank, N.A., San Francisco, CA (US)

(72) Inventor: Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 203 days.

(21) Appl. No.: 17/110,113

(22) Filed: Dec. 2, 2020

(51) Int. Cl.
*G06Q 20/20* (2012.01)
*G06F 3/01* (2006.01)
*G06Q 20/32* (2012.01)
*G06V 40/10* (2022.01)

(52) U.S. Cl.
CPC ........... *G06Q 20/204* (2013.01); *G06F 3/013* (2013.01); *G06F 3/017* (2013.01); *G06Q 20/206* (2013.01); *G06Q 20/3278* (2013.01); *G06V 40/10* (2022.01); *G06Q 20/3265* (2020.05)

(58) Field of Classification Search
CPC ....... G06F 3/013; G06F 3/017; G06Q 20/206; G06Q 20/3278; G06Q 20/3265; G06V 40/10
See application file for complete search history.

(56) References Cited

U.S. PATENT DOCUMENTS

| 7,974,714 B2 * | 7/2011 | Hoffberg | H04N 21/4318 360/75 |
| 9,417,754 B2 * | 8/2016 | Smith | G06F 1/1643 |
| 9,916,010 B2 | 3/2018 | Harris et al. | |

(Continued)

FOREIGN PATENT DOCUMENTS

| CN | 106600855 A | 4/2017 |
| CN | 109711827 A | 5/2019 |
| CN | 110570200 A | 12/2019 |

OTHER PUBLICATIONS

Kray et al., "User-defined gestures for connecting mobile phones, public displays, and tabletops", MobileHCI '10: Proceedings of the 12th international conference on Human computer interaction with mobile devices and services, Sep. 2010, pp. 239-248.

*Primary Examiner* — Michael Jared Walker
(74) *Attorney, Agent, or Firm* — K&L Gates LLP

(57) ABSTRACT

Systems, apparatuses, methods, and computer program products are disclosed for facilitating contactless and socially distant payments. Specifically, certain embodiments are configured for generating and utilizing a user expression map for associating user expressions to control events. The methods further correspond to receiving, in real-time, image data representative of at least a portion of a user body, the user body tracked by a contactless human to device interface system. The methods further include causing a retrieval of a user expression map from a first computing device for provision to a second computing device, determining using the user expression map, that the image data is associated (Continued)

with a control event indicative of a directive to perform a particular transaction, and triggering the control event to cause performance of the particular transaction based, at least in part on the determination that the image data is associated with the control event.

20 Claims, 9 Drawing Sheets

(56) References Cited

U.S. PATENT DOCUMENTS

| | | | |
|---|---|---|---|
| 10,007,984 B2 | 6/2018 | Lee et al. | |
| 10,026,116 B2 | 7/2018 | Zohar et al. | |
| 10,409,382 B2 | 9/2019 | Yamamoto et al. | |
| 10,558,272 B2* | 2/2020 | Parshionikar | G06V 40/20 |
| 10,643,213 B1* | 5/2020 | Bermudez | G06Q 20/389 |
| 10,922,957 B2* | 2/2021 | Rhoads | G06K 9/6253 |
| 11,100,498 B2* | 8/2021 | Van Os | G06Q 20/227 |
| 2010/0199229 A1* | 8/2010 | Kipman | G06V 20/64 |
| | | | 715/863 |
| 2014/0080428 A1* | 3/2014 | Rhoads | G06F 16/9535 |
| | | | 455/88 |
| 2015/0022675 A1* | 1/2015 | Lord | H04M 1/0264 |
| | | | 348/207.1 |
| 2015/0084859 A1* | 3/2015 | Itzhaik | G06F 3/017 |
| | | | 382/103 |
| 2015/0323997 A1* | 11/2015 | Haist | G06K 7/1091 |
| | | | 345/173 |
| 2016/0109954 A1* | 4/2016 | Harris | G06F 3/011 |
| | | | 345/156 |
| 2016/0187992 A1* | 6/2016 | Yamamoto | G06F 3/017 |
| | | | 345/156 |
| 2016/0189286 A1* | 6/2016 | Zohar | G06F 3/005 |
| | | | 348/150 |
| 2016/0378861 A1* | 12/2016 | Eledath | G06V 20/52 |
| | | | 707/766 |
| 2018/0025335 A1* | 1/2018 | Flast | G06Q 20/321 |
| | | | 705/40 |
| 2019/0054377 A1* | 2/2019 | Nelson | A63F 13/52 |
| 2019/0251331 A1* | 8/2019 | Shukla | G06V 40/20 |
| 2019/0251701 A1* | 8/2019 | Shukla | G06N 3/006 |
| 2019/0324527 A1* | 10/2019 | Presant | H04L 12/2816 |
| 2019/0346986 A1* | 11/2019 | Nilo | G06F 3/04845 |
| 2019/0354192 A1 | 11/2019 | Yamamoto et al. | |
| 2019/0362557 A1* | 11/2019 | Lacey | G06T 5/20 |
| 2019/0377417 A1* | 12/2019 | Friedman | H04L 63/0861 |
| 2020/0175510 A1* | 6/2020 | Fang | G06V 40/172 |
| 2020/0349538 A1* | 11/2020 | Glaser | G06V 40/70 |
| 2020/0372514 A1* | 11/2020 | Van Os | G06Q 20/405 |
| 2021/0067202 A1* | 3/2021 | Rule | H04M 1/0264 |
| 2021/0073790 A1* | 3/2021 | Hart | G06T 7/579 |
| 2021/0089133 A1* | 3/2021 | Sheng | G06F 3/017 |

* cited by examiner

900

Receive, in real-time, image data representative of at least a portion of a user body, the user body tracked by the contactless human to device interface system — 902

Cause to display, by the contactless human to device interface system, a graphical user interface that permits the user to generate a new control event to map to the image data based, at least in part on a determination that the image data is not associated with a control event — 904

Generate an updated user expression map that identifies a mapping of the image data to the new control event — 906

Store the updated user expression map for access by the contactless human to device interface system — 908

FIGURE 9

SYSTEMS AND METHODS FOR UTILIZING A USER EXPRESSION MAP CONFIGURED TO ENABLE CONTACTLESS HUMAN TO DEVICE INTERACTIONS

TECHNOLOGICAL FIELD

Example embodiments of the present disclosure relate generally to contactless payment authorization and, more particularly, to systems and methods for contactless gesture and gaze payment transactions performed via electronic devices using a user expression map.

BACKGROUND

Electronic devices such as mobile phones and other mobile devices such as wearables are being equipped with near field communication (NFC) technology to allow them to interface with contactless payment terminals, and other NFC equipped electronic devices. However, NFC technology use requires no more than two inches for data transfers to work and thus, violates social distancing guidelines. While mobile payments facilitate and stimulate the contactless payment, the procedure of entering a personal identification number (PIN) on a PIN pad, adding a tip via a point of sale device, and authenticating the user may be tedious, time-consuming, and defeat the purpose of contactless payments. Therefore, the convenience of contactless mobile payments is hindered. Accordingly, there is a need for systems and methods for facilitating true contactless payments within safe social distances.

BRIEF SUMMARY

In general, embodiments of the present invention provide methods, apparatus, systems, computing entities, and/or the like for utilizing a user expression map configured to enable contactless human to device interactions. In accordance with one aspect, a method is provided. In one embodiment, the method comprises receiving, in real-time, image data representative of at least a portion of a user body, the user body tracked by a contactless human to device interface system; causing a retrieval of a user expression map from a first computing device for provision to a second computing device; determining, using the user expression map, that the image data is associated with a control event indicative of a directive to perform a particular transaction; and triggering the control event to cause performance of the particular transaction based, at least in part on the determination that the image data is associated with the control event.

In accordance with another aspect, a computer program product is provided. The computer program product may comprise at least one computer-readable storage medium having computer-readable program code portions stored therein, the computer-readable program code portions comprising executable portions configured to receive, in real-time, image data representative of at least a portion of a user body, the user body tracked by a contactless human to device interface system; cause a retrieval of a user expression map from a first computing device for provision to a second computing device; determine, using the user expression map, that the image data is associated with a control event indicative of a directive to perform a particular transaction; and trigger the control event to cause performance of the particular transaction based, at least in part on the determination that the image data is associated with the control event.

In accordance with yet another aspect, an apparatus comprising at least one processor and at least one memory including computer program code is provided. In one embodiment, at least one memory and the computer program code may be configured to, with the processor, cause the apparatus to receive, in real-time, image data representative of at least a portion of a user body, the user body tracked by a contactless human to device interface system; cause a retrieval of a user expression map from a first computing device for provision to a second computing device; determine, using the user expression map, that the image data is associated with a control event indicative of a directive to perform a particular transaction; and trigger the control event to cause performance of the particular transaction based, at least in part on the determination that the image data is associated with the control event.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 9 is a flowchart illustrating operations performed, such as by the server of FIG. 2, to generate a user expression map, in accordance with an example embodiment described herein.

DETAILED DESCRIPTION

Figure 1:
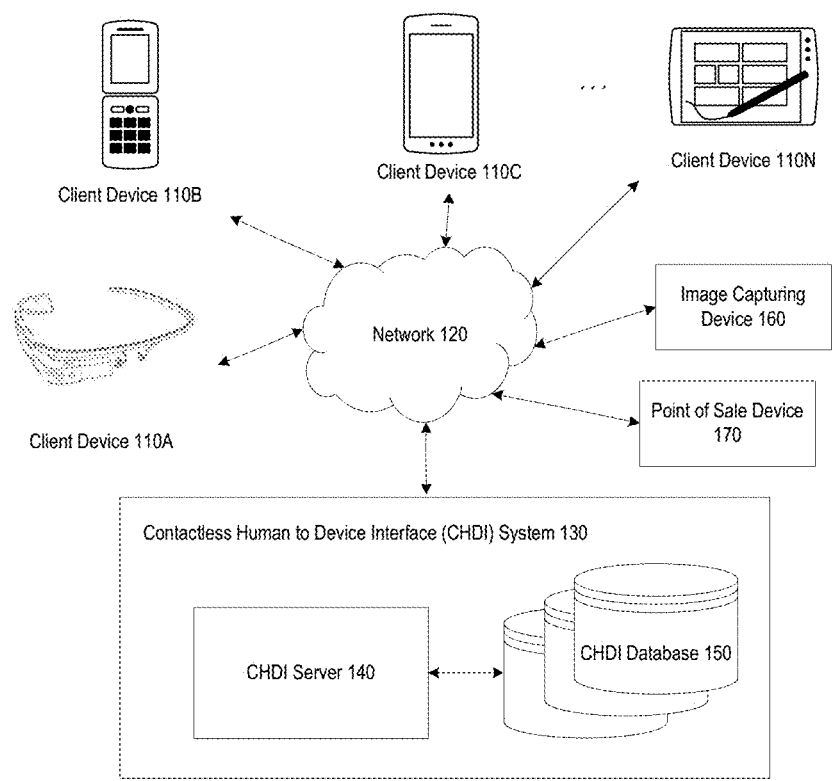
FIG. 1 is an exemplary overview of a system that can be used to practice embodiments of the present invention.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) an application hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

Various embodiments encompass a contactless human to device interface system to facilitate contactless and socially distant payments. Specifically, certain embodiments are configured for generating a user expression map for associating user expressions to control events. These user expression maps may be generated specifically for a user, for example, through application-guided mapping processes, and a resulting user expression map may be stored and in a manner accessible to a merchant or another user via a point of sale device or electronic device. For example, certain embodiments enable the generation of user-specific user expression maps where a user's gesture or eye gaze information would approve a payment transaction and/or define subsequent actions such as adding a tip, requesting a receipt, providing feedback, and the like.

Various embodiments of the invention utilize real-time image tracking of the user's body. Additionally, a gaze tracking system is provided to acquire eye images of a user's eyes which are then analyzed to generate gaze information which can be used to determine the user's gazing direction and fixation duration, so that payments may be transferred in an instance when a user is deemed to have looked directly at a subject (e.g., another user or object) for a threshold period of time. The user expression map thus defines gaze duration. For example, if a user's gaze remains on the same subject for a certain period of time, different payment attributes could change. For example, a user may set up a process to start a payment event by looking directly into a camera at a point of sale terminal for five seconds. At the six second mark, a pre-set payment is made. In some embodiments, the payment amount may be increased according to the period of time the user's gaze remains on the other user. Moreover, embodiments of the present invention provide for devices, systems, and methods for a user to make payments to other users who are proximate to the user's device in a simple and intuitive manner. In some embodiments, a "wave" gesture is used to identify the other users of devices that are nearby to the user's device with whom the user may transfer payment, such as to provide a tip or donation.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example system 100 including an example network architecture for a system, which may include one or more devices and sub-systems that are configured to implement some embodiments discussed herein. As shown in FIG. 1, the system 100 may comprise contactless human to device interface (CHDI) system 130, one or more user computing entities 110A-110N (e.g., client devices 110A-110N), one or more networks 120, one or more image capturing devices 160, one or more point of sale devices 170, and/or the like. Each of the components of the system may be in electronic communication with, for example, one another over the same or different wireless or wired networks as discussed herein.

In the example illustrated embodiment of FIG. 1, the CHDI system 130 may include CHDI server 140 and a plurality of CHDI databases 150, which can be embodied as a part of, for example, circuitry 200 and/or database, among other devices (not shown). In some embodiments, the CHDI system 130 may generate complex user expression maps for associating user expressions to control events (e.g., money transfer actions, payment transactions, etc.). The user expression maps are stored via a CHDI database 150 (shown in FIG. 1) which may be stored as a part of and/or in communication with one or more client devices 110A-110N and/or the CHDI system 130. The CHDI database 150 may further include information accessed and stored by the one or more client devices 110A-110N to facilitate the operations of the CHDI system 130.

The CHDI system 130 can communicate with one or more client devices 110A-110N, one or more image capturing devices 160, one or more point of sale devices 170, and/or computing entities via network 120, and a plurality of client devices 110A-110N may communicate with one another and/or other client devices such as the one or more image capturing devices 160 or one or more point of sale devices 170, via the network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. Further, the network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

Client devices 110A-110N, image capturing device 160, point of sale device 170, and/or CHDI system 130 may each be implemented as one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The depiction in FIG. 1 of "N" user computing entities is merely for illustration purposes. Any number of users and/or client devices 110 may be included in the system for accessing and/or implementing aspects of the CHDI system 130 discussed herein (e.g., via one or more interfaces). In one embodiment, the client devices 110A-110N may be configured to display or provide a CHDI system interface on a display of the user computing entity for viewing, creating, editing, and/or otherwise interacting with one or more user expression maps, which may be provided or pushed by the CHDI system 130 (and may be stored locally at one or more client devices 110A-110N). According to some embodiments, the CHDI system 130 may be configured to cause display or presentation of an interface for viewing, creating, editing, and/or otherwise interacting with one or more user expression maps.

As indicated above, the client devices 110A-110N may be any computing entity as defined above. Electronic data received by the CHDI system 130 from the client devices 110A-110N may be provided in various forms and via various methods. For example, the client devices 110A-110N may include desktop computers, laptop computers, smartphones, netbooks, tablet computers, wearables, and the like. In embodiments where a client device 110A-110N is a mobile device, such as a smart phone or tablet, the client devices 110A-110N may execute an "app" such as the CHDI application to interact with the CHDI system 130. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 110A-110N may interact with the CHDI system 130 via a web browser. As yet another example, the client device 110A-110N may include various hardware or firmware designed to interface with the CHDI system 130. As also shown in FIG. 1, an image capturing device (which in certain embodiments may be a part of one or more client devices 110A-110N or the point of sale device 170) provides real-time images of a user's body and additional information identifying the user or the user's environment to the CHDI system 130 (e.g., via network 120). For example, the additional information identifying the user or the user's environment may describe the physical location and orientation of the image capturing device during the image capturing and tracking, and may be provided by a GPS system, a gyroscope, and/or an accelerometer. Details on the user or a location of the user may also be provided to the CHDI system 130.

The CHDI system 130 may be embodied as one or more servers, such as that described below in connection with FIG. 2. The CHDI system 130 may further be implemented as local servers, remote servers, cloud-based servers (e.g., cloud utilities), or any combination thereof. The CHDI system 130 may receive, process, generate, and transmit data, signals, and electronic information to facilitate the operations of determining and providing robustness information for the user expression maps. In various embodiments, the CHDI system 130 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the CHDI system 130 to facilitate the operations of determining and providing robustness information for the user expression maps and/or improving the robustness of the user expression maps. For example, the one or more databases may store control signals, device characteristics, and access credentials for one or more of the client devices 110A-110N.

The client devices 110A-110N may be embodied by any computing devices known in the art, such as those described below in connection with FIG. 3. The CHDI system 130 may receive information from, and transmit information to, the one or more user client devices 110A-110N. For example, the CHDI system 130 may receive a request for control event information for a particular user expression generated and provided by a client device 110. For example, the CHDI system 130 may provide user expression maps such that a client device 110 and/or point of sale device 170 receives the control event information for a user expression captured by an image capturing device 160. It will be understood that in some embodiments, the client devices 110A-110N and the one or more point of sale devices 170 need not themselves be independent devices, but may be peripheral devices communicatively coupled to the image capturing device 160 and/or other computing devices.

Exemplary Computing Devices

A. Exemplary Circuitry of a Contactless Human to Device Interface (CHDI) System

Figure 2:
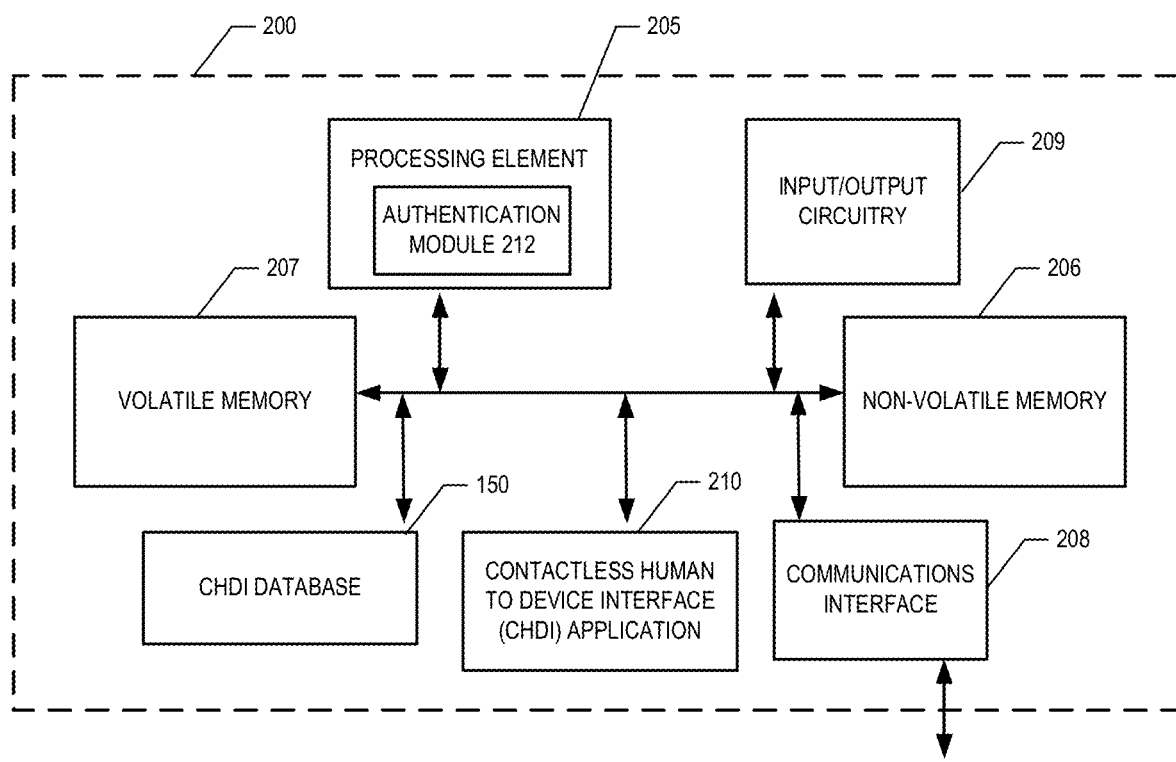
FIG. 2 illustrates an example server in accordance with some embodiments discussed herein.

FIG. 2 provides a schematic of circuitry 200, some or all of which may be included in, for example, Contactless Human to Device Interface (CHDI) system 130 and/or client devices 110A-110N. Any of the aforementioned systems or devices may include the circuitry 200 and may be configured to, either independently or jointly with other devices in a network 120 perform the functions of the circuitry 200 described herein. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As illustrated in FIG. 2, in accordance with some example embodiments, circuitry 200 can includes various means, such as processing element 205, volatile memory 207, non-volatile memory 206, communications interface 208, CHDI database 150, CHDI application 210, and/or input/output circuitry 209. As referred to herein, "circuitry" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., non-volatile memory 206) that is executable by a suitably configured processing device (e.g., processing element 205), or some combination thereof.

Input/output circuitry 209 may be in communication with processing element 205 to receive an indication of a user input and/or to provide an audible, visual, mechanical, or other output to a user (e.g., customer and/or merchant). As such, input/output circuitry 209 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output circuitry 209 may be reduced as compared to embodiments where circuitry 200 is implemented as an end-user machine (e.g., customer device and/or merchant device) or other type of device designed for complex user interactions. In some embodiments (like other components discussed herein), input/output circuitry 209 may even be eliminated from circuitry 200. Alternatively, such as in embodiments wherein circuitry 200 is embodied as a server or database, at least some aspects of input/output circuitry 209 may be embodied on an apparatus used by a user that is in communication with circuitry 200. Input/output circuitry 209 may be in communication with the volatile memory 207, non-volatile memory 206, communications interface 208, and/or any other component(s), such as via a bus. One or more than one input/output circuitry and/or other component can be included in circuitry 200.

CHDI database 150 and CHDI system 130 may also or instead be included and configured to perform the functionality discussed herein. In some embodiments, some or all of the functionality may be performed by processing element 205. In this regard, the example processes and algorithms discussed herein can be performed by at least one processing element 205, CHDI database 150, and/or CHDI system 130. For example, non-transitory computer readable media can be configured to store firmware, one or more application programs, and/or other software, which include instructions and other computer-readable program code portions that can be executed to control each processor (e.g., processing element 205, CHDI database 150, and/or CHDI system 130) of the components of circuitry 200 to implement various operations, including the examples shown above. As such, a series of computer-readable program code portions are embodied in one or more computer program goods and can be used, with a computing entity, server, and/or other programmable apparatus, to produce machine-implemented processes.

As indicated, in one embodiment, circuitry 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the circuitry 200 may communicate with other computing entities, one or more user client devices 110A-110N, and/or the like.

As shown in FIG. 2, in one embodiment, the circuitry 200 may include or be in communication with one or more processing elements 205 (also referred to as processors, processing circuitry, and/or similar terms used herein interchangeably) that communicate with other elements within the circuitry 200 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

As shown in FIG. 2, an authentication module 212 can reside within the processing element 205 to verify a series of user gestures with a stored sequence or pattern of gestures designated for a particular user. In some embodiments, passwords (that are utilized for login password for logging into the CHDI system 130) are based on entering alphanumeric characters using a keyboard. In one embodiment, the CHDI system 130 can authenticate using a password or without using text (which also means, without a keyboard/keypad), thereby allowing greater deployment, particularly with devices that do not possess a sufficiently large form factor to accommodate a keyboard.

In some embodiments, the authentication module 212 may prompt a user to provide a certain type of user data to be authenticated by the CHDI system 130 to determine whether the user data received in response to such a prompt passes authentication. For example, the authentication module 212 may be configured to authenticate users according to a corresponding user authentication reference characteristic. Different embodiments of the CHDI system 130 may include different combinations of user authentication reference characteristics depending on the security needs. In some embodiments, the authentication module 212 is operable to authenticate users based on any form of biometric recognition, facial recognition, physiological characteristics, garments, or location information. In some embodiments, the authentication module 212 is operable to authenticate users based on password detection, security question confirmation, cookie or certificate detection, or any other suitable authentication characteristic.

In one embodiment, the circuitry 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Non-volatile memory 206 may also be embodied as a data storage device or devices, as a separate database server or servers, or as a combination of data storage devices and separate database servers. Further, in some embodiments, non-volatile memory 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the relevancy prediction system may be stored. As a person of ordinary skill in the art would recognize, the information/data required for the operation of the relevancy prediction system may also be partially stored in the cloud data storage system and partially stored in a locally maintained data storage system.

Non-volatile memory 206 may include information/data accessed and stored by the CHDI system 130 to facilitate the operations of the system. More specifically, non-volatile memory 206 may encompass one or more data stores configured to store information/data usable in certain embodiments.

Although these components 150 and 205-210 may in part be described using functional language, it will be understood that the particular implementations necessarily include the use of particular hardware. It should also be understood that certain of these components 150 and 205-210 may include similar or common hardware. For example, the CHDI application 210 and/or authentication module 212 may leverage use of the processing element 205 or memories 206 and 207, but duplicate hardware is not required to facilitate operation of these distinct components of the circuitry 200 (although duplicated hardware components may be used in some embodiments, such as those in which enhanced parallelism may be desired).

B. Exemplary Client Device

Figure 3:
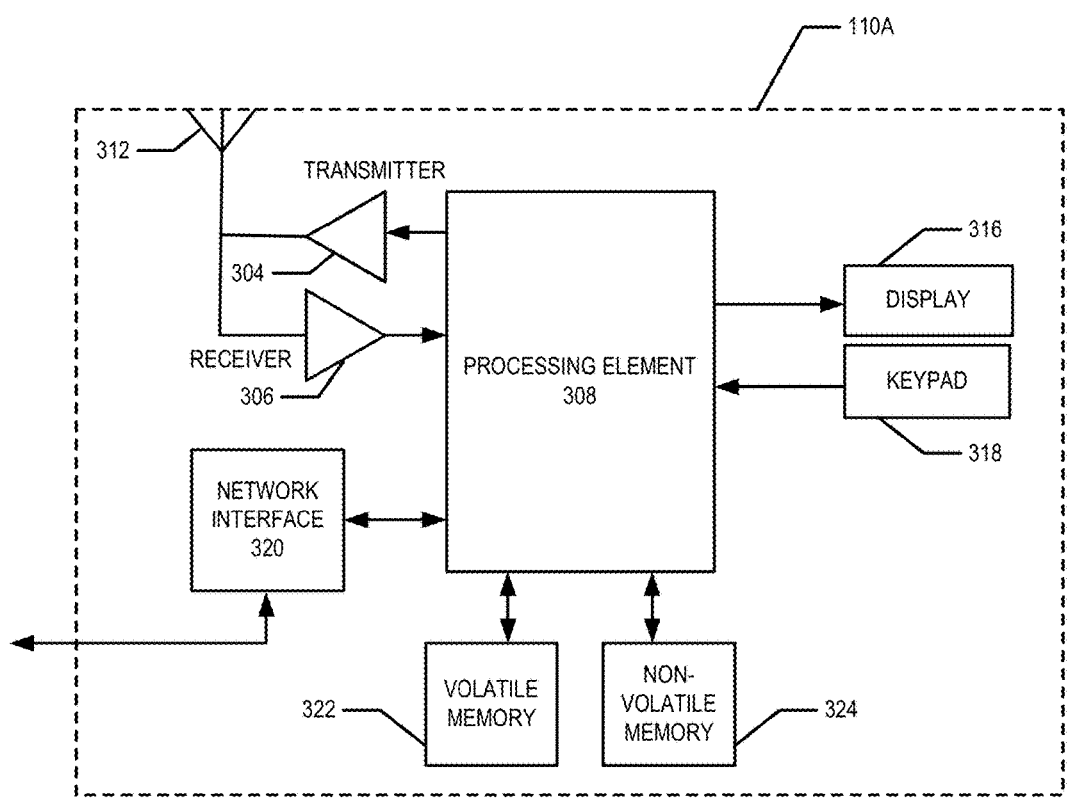
FIG. 3 illustrates an example user computing entity in accordance with some embodiments discussed herein.

FIG. 3 provides an illustrative schematic representative of client devices 110A-110N that can be used in conjunction with embodiments of the present invention. As shown in FIG. 3, a client device 110A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an CHDI system 130, another client device 110A, image capturing device 160, point of sale device 170, and/or the like. In this regard, the client device 110A may be capable of operating with one or more air interface standards, communication protocols, modulation types, and access types. More particularly, the client device 110A may operate in accordance with any of a number of wireless communication standards and protocols. In a particular embodiment, the client device 110A may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the client device 110A can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110A can also download changes, add-ons, and updates, for instance, to its firmware, software (e.g., including executable instructions, applications, program modules), and operating system.

According to one embodiment, the client device 110A may include location determining aspects, devices, modules, functionalities, and/or similar words used herein interchangeably. For example, the client device 110A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's position in connection with a variety of other systems, including cellular towers, Wi-Fi access points, and/or the like. Similarly, the client device 110A may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE (Bluetooth Low Energy) transmitters, NFC transmitters, and/or the like. These indoor positioning aspects can be used in a variety of settings to determine the location of someone or something to within inches or centimeters.

The client device 110A may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the client device 110A to cause display or audible presentation of information/data and for user interaction therewith via one or more user input interfaces. As just one specific example, the client device 110A may be configured to output various interface screens associated with the CHDI application, which may provide various setup/registration screens and/or may provide one or more payment transaction alerts for a user of the user computing entity. The user input interface can comprise any of a number of devices allowing the client device 110A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the client device 110A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the client device 110A can collect information/data, user interaction/input, and/or the like.

The client device 110A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client device 110A. Again, as a specific example, the user computing entity memory storage areas (encompassing one or both of the volatile memory 322 and/or non-volatile memory 324) may store the CHDI application thereon. The memory storage areas discussed herein may further encompass one or more aspects of the CHDI database 150, as discussed in greater detail herein (however the CHDI database 150 may be stored in association with the CHDI system 130 in certain embodiments).

Client device 110A may include an image capturing device such as image capturing device 160 comprising a plurality of sensors to obtain information regarding the user's body and the environment of the client device 110A. The image capturing device 160 may further comprise a gazing tracking camera configured to acquire eye images (e.g., video images) of the user's eye. These eye images can then be analyzed by the CHDI system 130 to generate gaze direction information, which can be used to determine the user's gazing direction. The gaze direction information can be correlated to the scene images acquired by the image capturing device 160 to determine at what subject (e.g., person, place, or thing) the user is looking at when viewing the external environment through a gaze tracking system carried by image capturing device 160 and/or the client device 110A.

Alternatively or in addition, client device 110A can include a set of REST-based APIs so that the device can communicate with the image capturing device 160 and/or the gaze tracking system. The plurality of sensors of the image capturing device may include image-based sensors, such as imaging cameras or optional sensors to obtain visual information (imagery). These sensors also may include non-image-based sensors, such as Global Positioning System (GPS) receivers, accelerometers, gyroscopes, solid state compasses, radio-frequency identification (RFID), wireless interfaces (e.g., IEEE 802.11 transceivers or Bluetooth™ receivers), magnometers, ambient light sensors, and the like.

Exemplary System Operations

The operation of various embodiments of the present invention will now be described. As discussed herein, various embodiments are directed to systems and methods for generating a user expression map for associating user expressions to control events.

The CHDI system 130 may be configured to provide a mobile device application such as a CHDI application (app) that is adapted to be stored in memory on the client device 110A and may operate functionality related to one or more of: user expression (e.g., gesture or eye gaze) payment preparation and real-world user expression payment implementation.

A. Exemplary Features Provided by Gesture Payment Preparation

User expression (specifically, user's gestures) payment preparation can include, for example the following features: (1) capture of a real-time image of the user's body; (2) detection or recognition of a gesture; (3) associating and mapping the gesture with a control event indicative of a directive to perform a particular transaction (e.g., initiate payment with credit card); (4) generation and storage of the mapping to a user expression map so that the CHDI system can later retrieve and transmit or export the control event to a point of sale device for which the point of sale device performs the particular transaction.

Figure 4A:
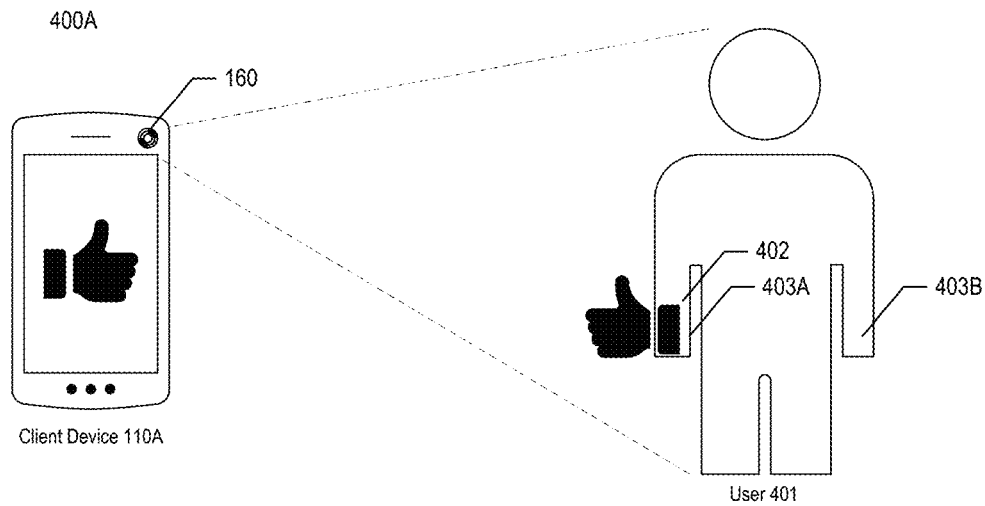
FIGS. 4A, 5A, 6A, and 7A illustrate example contactless human to device environments in accordance with some embodiments discussed herein.

As illustrated in FIG. 4A, a user 401 provides a user expression 402 (e.g., "thumbs up" gesture) to a client device 110A so as to perform a payment transaction or perform another such action. In some embodiments, the client device 110A is a smart phone equipped with an image capturing device 160 (which in other embodiments may be separate from the client device 110A) comprising a plurality of sensors to obtain information regarding user 401's body and the environment of the client device 110A. The sensors include image-based sensors, such as imaging cameras, ultrasonic sensors for pupil detection and gaze tracking, IR (infrared) sensors, imaging sensors to obtain visual information (imagery), and/or near-eye cameras.

In some embodiments, the user expression is performed by the user 401 by way of input gestures. Additionally or alternatively, the user expression may be performed by the user 401 by way of their client device 110A. For example, a user expression corresponds with motion information indicative of movement of the client device 110A in a three-dimensional motion. For example, the user 401 may move the client device 110A in a circular loop and/or in one or more horizontal and vertical movements. In another example, the user 401 may shake the client device 110A.

In one embodiment, the CHDI system 130 is configured to receive, in real-time, (and/or capture, wherein the image capturing device 160 is part of the client device 110A) image data representative of at least a portion of an object (e.g., at least a portion of a user 401's body). In this embodiment, the user 401 performs a "thumbs up" gesture captured by the image capturing device 160. The image data (including video information) comprises a real-time image and/or video of user 401's body (specifically, user 401's hands, or aspects of the user's hands and arms). Once the image data is received or captured, the CHDI system 130 is configured to process and analyze the image data to determine the location and movement of one or more known visual landmarks or reference targets (e.g., user 401's hands 403A and 403B). Detecting the one or more known visual landmarks positioned at a defined position in relation to the user 401's body, the CHDI system 130 may then infer the 6-dimensional space of user expressions or poses (e.g., X/Y/Z positions and roll/pitch/yaw orientations) of the image capturing device 160 with respect to the one or more known visual landmarks. The CHDI system 130 is then configured to determine what gesture the user is performing based on the movement of the one or more known visual landmarks. The determined gesture is then compared to predefined gestures in a user expression map, wherein the user expression map comprises predefined gestures mapped to control events. In the instance in which a matching gesture is found, the CHDI system is then configured to determine, using the user expression map, whether the image data (e.g., matching gesture) is associated with a control event indicative of a directive to perform a particular transaction. Then, as will be described in reference to FIGS. 5A and 5B, a point of sale device performs the particular transaction (e.g., process debit card payment).

Figure 4B:
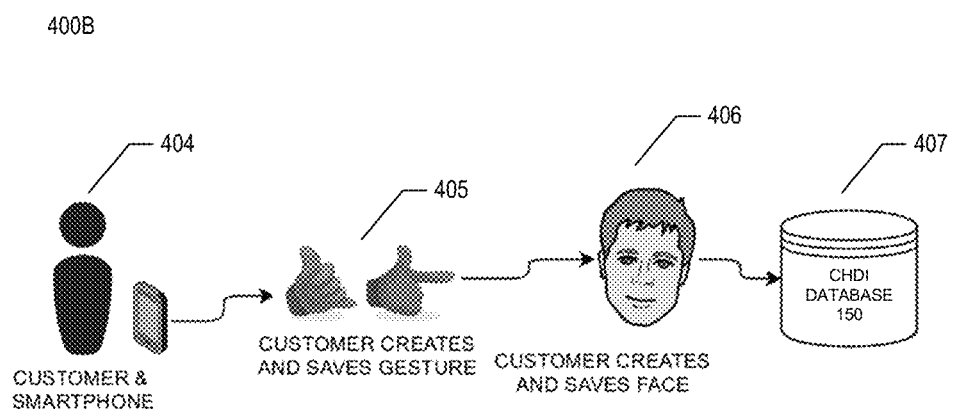
FIGS. 4B, 5B, 6B, and 7B illustrate activity-level diagrams in accordance with some embodiments discussed herein.

If no match can be found with at least a minimum confidence, level of certainty, or other such criterion or threshold, the CHDI system 130 is configured to cause to display a graphical user interface that permits the user to identify a new control event to map to the image data based, at least in part on the determination that the image data is not associated with a control event. In this case and as shown in FIG. 4B, the process illustrates example operations for generating an updated user expression map for the image data and associating the image data to the one or more known visual landmarks, and thereafter mapping the image data to a control event. In some embodiments, mapping the image data to a control event comprises defining a rule and associating the rule to the gesture. The process illustrated in FIG. 4B starts at step 404 where the user 401 (e.g. customer) performs a gesture that is captured by their client device 110A (e.g., smartphone). Prior to performing the gesture, in some embodiments, the customer using their smartphone logs in to the CHDI application (app). In this case, the CHDI server 140 provides the CHDI app and upon activation of the CHDI app by the smartphone, provides a login interface that facilitates entering a valid username and password. The CHDI server 140 authenticates the entered username and password, and then redirects the CHDI app to an appropriate graphical user interface if the authentication is successful. In step 405, the smartphone displaying a graphical user interface further provides the customer the ability create and save the gesture including the rule comprising the control event associated with the gesture. In this case, the CHDI server is configured to process the image data to produce gesture information. In some embodiments, the CHDI sever comprises data processing circuitry configured to receive and/or capture the series of images from the image capturing device 160 and based thereon, produce gesture information (e.g., gesture tracking data) with respect to the user 401. In some embodiments, wherein generating the updated user expression map that identifies a mapping of the image data to the new control event further causes the CHDI server to facilitate identification of an expression performed by a user or an expression performed by the user by way of the first computing device relative to one or more visual landmarks of the gesture information. In step 406, the CHDI server 140 provides another layer of security such as facial recognition so as to verify the identity of the customer based on the user's facial features. The customer's facial feature serves as at least one user authentication reference characteristic to prevent unauthorized parties from performing the gesture and thereby executing the control event associated with the gesture. In step 407, the CHDI server 140 generates an updated user expression map that identifies a mapping of the gesture to the control event and the required security measure, and then, the CHDI server 140 stores the updated user expression map for later retrieval.

B. Exemplary Features Provided by Gesture Payment Real-World Implementation

Figure 5A:
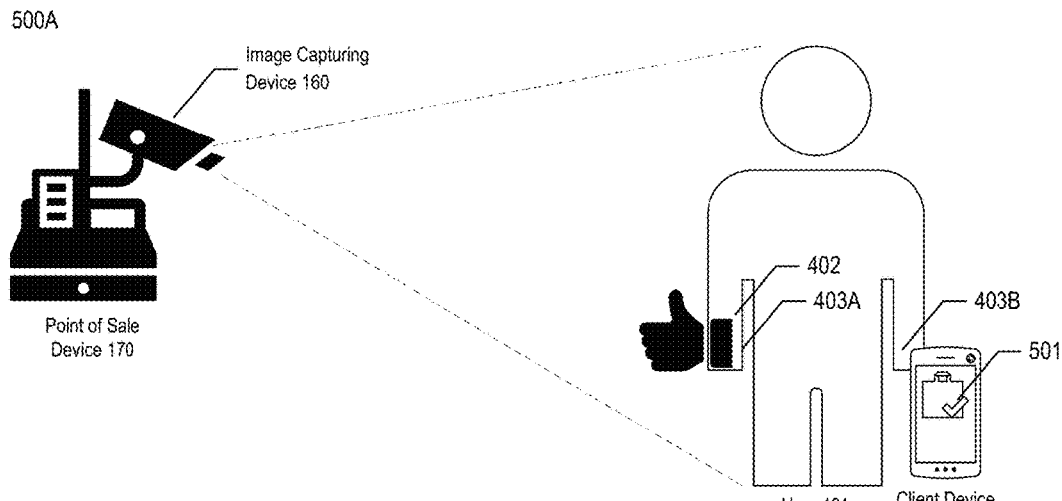
Figure 5B:
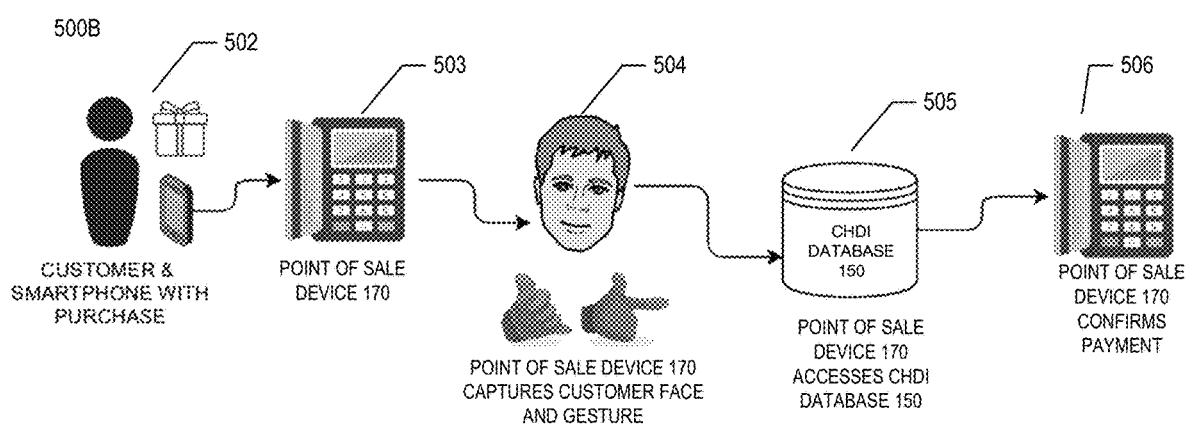

FIGS. 5A and 5B illustrate exemplary activities in which a user 401 is provided an option of engaging in real-world payment transactions using contactless payment methods. Such contactless payment methods can include, for example the following features: (1) capture of a real-time image of the user's body; (2) detection or recognition of a gesture; (3) exporting of control events to a point of sale device via at least one of a short range ad-hoc communication or a local area network; (4) confirmation of payment transactions so that the user 401 can confirm the payment transaction command(s) that may be used to create a learned user defined expression (e.g., hand gesture) command (e.g., control event).

As illustrated in FIG. 5A, a user 401 provides a user expression 402 (e.g., "thumbs up" gesture) to a point of sale device 170 (e.g., merchant terminal) so as to perform a payment transaction or perform another such action. In some embodiments, the point of sale device 170 is equipped with an image capturing device 160 (which in other embodiments may be separate from the point of sale device 170) comprising a plurality of sensors to obtain information regarding user 401's body and the environment of the client device 110A associated with the user 401. The sensors include image-based sensors, such as imaging cameras, ultrasonic sensors for pupil detection and gaze tracking, IR (infrared) sensors, imaging sensors to obtain visual information (imagery), and/or near-eye cameras.

In one embodiment, the CHDI system 130 is configured to receive, in real-time, (and/or capture, wherein the image capturing device 160 is part of or in communication with the point of sale device 170) image data representative of at least a portion of an object (e.g., at least a portion of a user 401's body). In this embodiment, the user 401 performs a "thumbs up" gesture captured by the image capturing device 160. The image data (including video information) comprises a real-time image and/or video of user 401's body (specifically, user 401's hands, or aspects of the user's hands and arms). Once the image data is received or captured, the CHDI system 130 is configured to cause a retrieval of a user expression map from a first computing device (e.g., client device 110A) for provision to a second computing device (e.g., the point of sale device 17). The CHDI system 130 is then configured to process and analyze the image data to determine the location and movement of one or more known visual landmarks or reference targets (e.g., user 401's hands 403A and 403B). Detecting the one or more known visual landmarks positioned at a defined position in relation to the user 401's body, the CHDI system 130 may then infer the 6-dimensional space of user expressions or poses (e.g., X/Y/Z positions and roll/pitch/yaw orientations) of the image capturing device 160 with respect to the one or more known visual landmarks. The CHDI system 130 is then configured to determine what gesture the user is performing based on the movement of the one or more known visual landmarks. The determined gesture is then compared to predefined gestures in a user expression map, wherein the user expression map comprises predefined gestures mapped to control events. In the instance in which a matching gesture is found, the CHDI system is then configured to determine, using the user expression map, whether the image data (e.g., matching gesture) is associated with a control event indicative of a directive to perform a particular transaction. Then, the CHDI system is configured to trigger the control event to perform the particular transaction (e.g., process debit card payment) based, at least in part on the determination that the image data is associated with the control event. In this case, the user expression map is configured to enable the CHDI system to export the control event to the point of sale device 170 for which the point of sale device 170 performs the particular transaction. In some embodiments, the CHDI system is configured to transmit a transaction notification 501 which may be displayed on the client device 110A so that the user 401 is notified or can confirm the particular transaction that will be placed at the point of sale device 170. In such embodiments, the CHDI system receives an action in response to determination that the image data is associated with the control event and is caused to display a graphical user interface that performs actuation of a visual, haptic, or audible feedback (e.g., transaction notification) confirming execution of the control event to perform the particular transaction.

In some embodiments, the CHDI system is configured to establish contact with the point of sale device 170 subsequent to receiving the image data, wherein establishing contact with the point of sale device 170 comprises identifying the point of sale device 170 based on one or more of the location of the point of sale device 170, the location of the client device 110A, or the orientation of the client device 110A. In this case, establishing contact with the second computing device is performed by way of at least one of a short range ad-hoc communication or a local area network. The client device 110A and the point of sale device 170 may include circuitry and components that enable such devices to locate one another based on both a geographic location of the respective devices as well as orientations of the respective devices. For example, assume that user 401, the user of client device 110A, wishes to checkout at a particular point of sale device 170, the user 401 initiates the payment transaction transfer by pointing their client device 110A towards the point of sale device 170. In this case, the CHDI system identifies the particular point of sale device 170 for provision of the user expression map based on the location of such devices and the orientation information provided by the client device 110A.

The process 500B in which the user 401 is provided an option of engaging in real-world payment transactions using contactless payment methods is illustrated in FIG. 5B. This exemplary process illustrated in FIG. 5B starts at step 502 where the user 401 (e.g. customer) equipped with their smartphone (e.g., client device 110A) would like to purchase a gift and has opted to make a contactless payment with their smartphone. In some embodiments, before contactless payment is initiated, the point of sale device 170 rings up the gift to be paid via contactless payment as shown in step 503. In this case, the smartphone is equipped with a payment instrument (e.g., credit card or debit card) data which is used by the point of sale device 170 to process the real-world payment transaction. In step 504, the point of sale device 170 using the CHDI application (app) receives and/or captures the customer's face and gesture. In some embodiments, to make contactless payment, the user performs a gesture that is captured by the point of sale device 170. In some embodiments, the merchant has already logged into the CHDI app prior to capturing and/or receiving the customer's face and gesture. In some embodiments, prior to performing the gesture, the customer using their smartphone logs in to the CHDI app. In this case, the CHDI server 140 provides the CHDI app and upon activation of the CHDI app by the smartphone and/or the point of sale device 170, provides a login interface that facilitates entering a valid username and password. The CHDI server 140 authenticates the entered username and password, and then redirects the CHDI app to an appropriate graphical user interface if the authentication is successful. In step 505, the point of sale device 170 accesses the CHDI database 150 comprising the user expression maps. In some embodiments, this may be accomplished by the CHDI server 140 in which the CHDI server 140 connects to the Internet Protocol (IP) address of the point of sale device 170 in order to provide the user expression maps and/or access to the CHDI database 150 comprising the user expression maps. In this case, access to the user expression maps stored in the CHDI database 150 enable the exportation of control events associated with the gestures to the point of sale device 170 for which the point of sale device 170 performs the payment transaction. The point of sale device 170 using the CHDI app is configured to process the image data to produce gesture information so as to determine, using the user expression map, whether the image data is associated with a control event indicative of a directive to perform a particular transaction by determining that an expression performed by a user or an expression performed by the user by way of the first computing device, corresponds to a predefined user expression based upon the gesture information. In step 506, the point of sale device 170 processes the payment transaction and confirms payment. In some embodiments, the user 401 is able to confirm on their smartphone that the transaction for which they are making is correct before the payment is processed.

C. Exemplary Features Provided by Eye Gaze Payment Preparation

User expression (specifically, user's eye gaze) payment preparation can include, for example the following features: (1) capture of a real-time image of the user's body (specifically, user's eye); (2) determination of eye gaze information comprising gaze direction and/or how long the user looked directly at the identified subject; (3) associating and mapping the eye haze information with a control event indicative of a directive to perform a particular transaction (e.g., initiate a money transfer to the identified subject); (4) generation and storage of the mapping to a user expression map so that the CHDI system can later retrieve and transmit or export the control event to a client device associated with the identified subject for which the client device performs the particular transaction (e.g., receives money transfer).

Figure 6A:
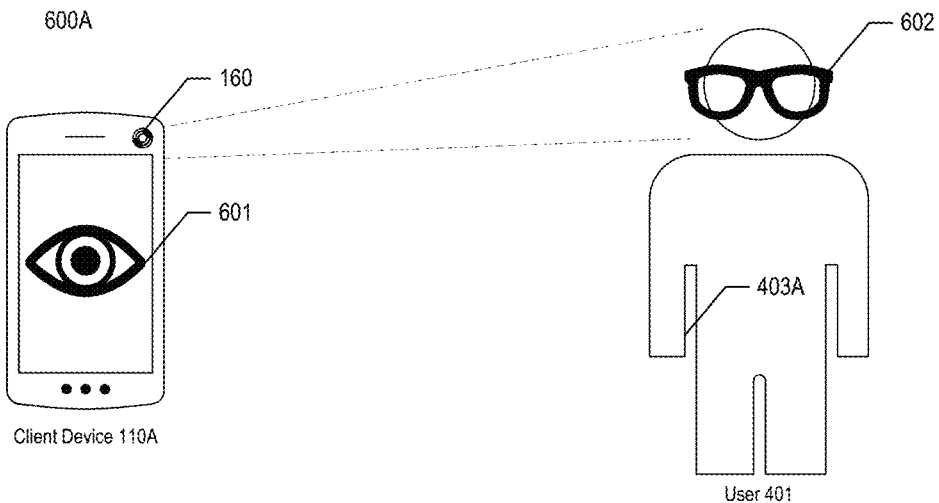

As illustrated in FIG. 6A, a user 401 provides a user expression (e.g., eye gaze information 601) to a client device 110A so as to perform a money transfer transaction or perform another such action. In some embodiments, the client device 110A is a smart phone equipped with an image capturing device 160 (which in other embodiments may be separate from the client device 110A). In some embodiments, the user 401 provides the eye gaze information 601 to an eyeglasses-like head-mountable client device 602. The image capturing device 160 and the eyeglasses-like head-mountable client device 602 may each comprise a plurality of sensors to obtain information regarding the user 401's eye gaze information and the environment of the client device 110A and/or eyeglasses-like head-mountable client device 602. The sensors include image-based sensors, such as imaging cameras, ultrasonic sensors for pupil detection and gaze tracking, IR (infrared) sensors, imaging sensors to obtain visual information (imagery), and/or near-eye cameras.

In one embodiment, the CHDI system 130 is configured to receive (and/or capture, wherein the image capturing device 160 is part of the client device 110A or the user 401 is wearing the eyeglasses-like head-mountable client device 602) image data of the user's eye. In this embodiment, the user 401 fixes their gaze on a particular subject (e.g., another user or object) which is captured by the image capturing device 160 and/or the eyeglasses-like head-mountable client device 602. The CHDI system 130 is then configured to process the image data to produce eye gaze information. The CHDI system 130 is then configured to facilitate identification of user eye maintenance on a subject for a threshold amount of time based upon the eye gaze information. For example and in some embodiments, the user 401 inputs, via a graphical user interface provided by the CHDI system 130, the particular subject the user has fixed their gaze on (e.g., a known visual landmark or reference target such as the user 401's hand 403A). The image data (including video information) comprises a real-time image and/or video of user 401's body (specifically, user 401's eye, or aspects of the user's eyes and face). Once the image data is received or captured, the CHDI system 130 is configured to process and analyze the image data to determine eye gaze information including gazing direction indicating where in the external environment (specifically, the subject) the user is gazing. In some embodiments wherein the user 401 is wearing the eyeglasses-like head-mountable client device 602, the CHDI system 130 may further correlate the gazing to external environment image data acquired by the eyeglasses-like head-mountable client device 602 to determine what subject (e.g., person or object) the user 401 is directly viewing. The eye gaze information also includes information related to whether the user 401 looked directly at the subject for a threshold period of time. In this case, the user 401 may set, via the CHDI app, payment gazing thresholds dependent upon the length of time the user looked directly at the subject (e.g., user 401 gazes at another user for 10 seconds, the another user receives 2 dollars). Thus, certain embodiments of the invention described herein offer contactless money transfer operations.

Figure 6B:
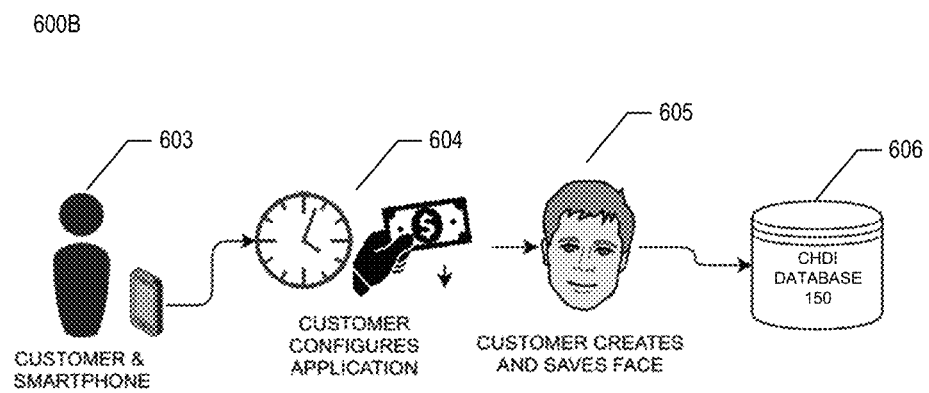

In some embodiments, the CHDI system 130 is configured to cause to display a graphical user interface that permits the user to identify a new control event to map to the image data comprising the eye gaze information based, at least in part on the determination that the image data is not associated with a control event. In this case and as shown in FIG. 6B, the process illustrates example operations for generating an updated user expression map for the image data comprising the eye gaze information and mapping the image data to a control event. In some embodiments, mapping the image data to a control event comprises defining a rule and associating the rule to the eye gaze information. The process illustrated in FIG. 6B starts at step 603 where the client device 110A (e.g., smartphone or smart glasses) installed with the CHDI app displays one or more visual targets, such as symbols, in order to give the customer a subject to gaze at thus capturing eye gaze information. Prior to this, the CHDI app provides a login interface that facilitates entering a valid username and password. The CHDI server 140 authenticates the entered username and password, and then redirects the CHDI app to the graphical user interface displaying the one or more visual targets if the authentication is successful. In step 604, the smartphone displaying a graphical user interface further provides the customer the ability create a rule comprising a control event and associate the rule and control event with the eye gaze information captured by the CHDI app. For example, the rule may include setting payment thresholds or scaling dollar amounts dependent upon whether the user looked directly at a subject one or more specified durations.

In step 605, the CHDI server 140 provides another layer of security such as facial recognition so as to verify the identity of the customer based on the user's facial features. The customer's facial feature serves as at least one user authentication reference characteristic to prevent unauthorized parties from performing the gesture and thereby executing the control event associated with the gesture. In step 606, the CHDI server 140 generates an updated user expression map that identifies a mapping of the eye gaze information to the control event and the required security measure, and then, the CHDI server 140 stores the updated user expression map for later retrieval.

D. Exemplary Features Provided by Eye Gaze Payment Real-World Implementation

Figure 7A:
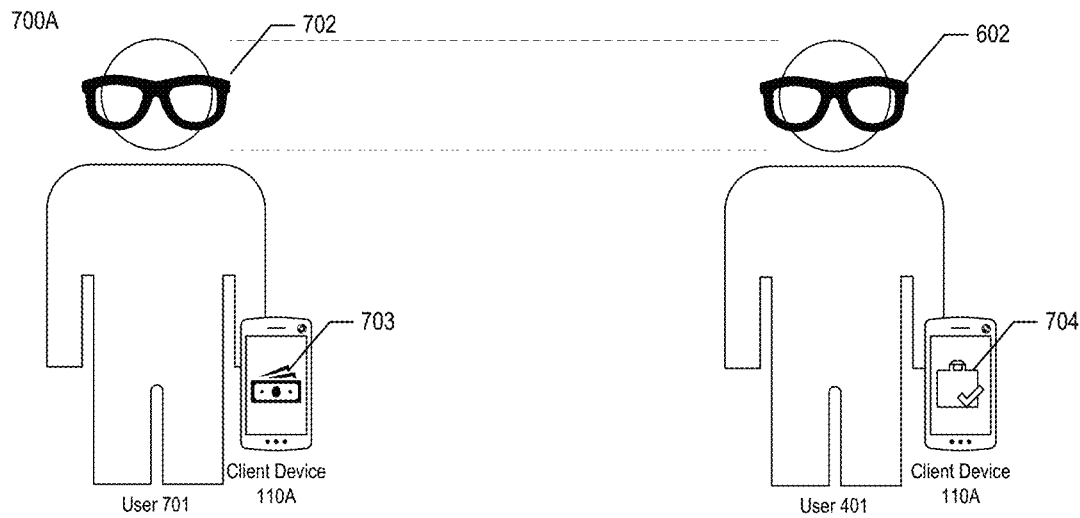
Figure 7B:
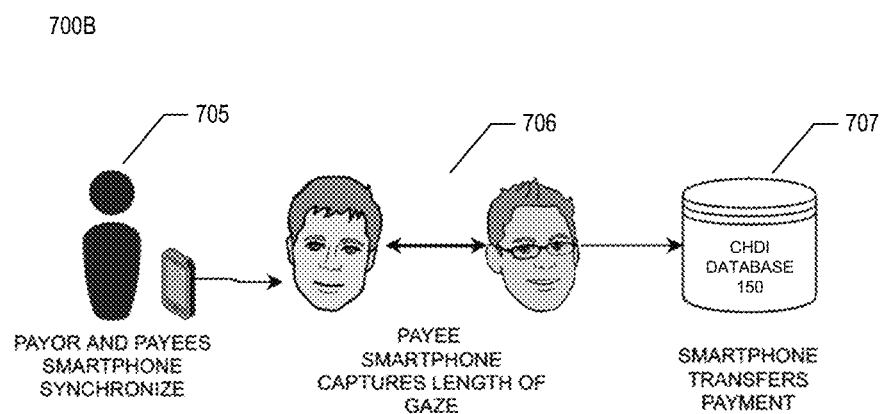

FIGS. 7A and 7B illustrate exemplary activities in which a user 401 is provided an option of engaging in real-world payment transactions using contactless payment methods. Such contactless payment methods can include, for example the following features: (1) capture of a real-time image of the user's body (specifically, the user's eyes); (2) monitoring eye gaze information; (3) determine one or more devices proximate to the user that are detected via at least one of a short range ad-hoc communication or a local area network; (4) execute the control event associated with the eye gaze information; and (5) confirmation of payment transactions so that the user 401 can confirm the payment transaction command(s).

As illustrated in FIG. 7A, a user 401 provides a user expression 402 (e.g., eye gaze information) to their eyeglasses-like head-mountable client device 602 so as to perform a money transfer transaction or perform another such action, wherein user 701 is the recipient of the money transfer transaction. In some embodiments, the user 701 is equipped with an eyeglasses-like head-mountable client device 702. The eyeglasses-like head-mountable client device 602 and eyeglasses-like head-mountable client device 702 may be equipped with a plurality of sensors to obtain information regarding users 401 and 701's respective bodies and their environment. The sensors include image-based sensors, such as imaging cameras, ultrasonic sensors for pupil detection and gaze tracking, IR (infrared) sensors, imaging sensors to obtain visual information (imagery), and/or near-eye cameras.

In one embodiment, the CHDI system 130 is configured to receive, in real-time, image data representative of at least a portion of a user body comprising eye gaze information of user 401 via their eyeglasses-like head-mountable client device 602. In this embodiment, the user 401 focuses their gaze on user 701. The image data (including video information) comprises a real-time image and/or video of the user 401's eye gaze information. Once the image data comprising the eye gaze information is received, the CHDI system 130 is configured to cause a retrieval of a user expression map from the client device 110A for provision to a second computing device. The CHDSI system 130 is then configured to process and analyze the eye gaze information to determine the gazing direction indicating where in the external environment the user is gazing which in this instance, the gazing direction is towards the user 701. In analyzing the eye gaze information, the CHDI system 130 makes a determination of whether the user looked directly at user 701 for a threshold period of time. The CHDI system 130 is then configured to determine, using the user expression map, whether the eye gaze information is associated with a control event indicative of a directive to perform a particular transaction. Then, the CHDI system is configured to trigger the control event to perform the money transfer transaction based, at least in part on the determination that the eye gaze information is associated with the control event. The control event comprises one or more rules which may include setting payment thresholds or scaling dollar amounts dependent upon whether the user looked directly at a subject (e.g., user 701) one or more specified durations.

Accordingly, embodiments of the present invention provide for devices, systems, and methods for a user to initiate a money transfer to other users who are proximate to their device in a simple and intuitive manner. In some embodiments, the CHDI system is configured to transmit a transaction notification 703 which may be displayed on the recipient client device and/or the eyeglasses-like head-mountable client device 702 so that the user 702 is notified that they are a recipient of a money transfer from user 401. Additionally or alternatively, the CHDI system is configured to transmit a transaction notification 704 which may be displayed on the user 401's client device and/or their eyeglasses-like head-mountable client device 602 so that the user 401 is notified or can confirm the money transfer transaction. In such embodiments, the CHDI system receives an action in response to determination that the image data is associated with the control event and is caused to display a graphical user interface that performs actuation of a visual, haptic, or audible feedback (e.g., transaction notification) confirming execution of the control event to perform the particular transaction.

The process 700B in which the users 401 and 701 are engaging in a real-world money transfer transaction using contactless payment methods is illustrated in FIG. 7B. This exemplary process illustrated in FIG. 7B starts at step 705 where the user 401 (e.g. payor) equipped with their eyeglasses-like head-mountable client device 602 (e.g., client device 110A) would like to transfer money to user 701 (e.g., payee) and as such, the CHDI server 140 may synchronize each user's respective eyeglasses-like head-mountable client device where the eyeglasses-like head-mountable client device 602 belonging to user 401 and the eyeglasses-like head-mountable client device 702 belonging to user 701 utilize one or more different communication protocols such as, for example, Bluetooth or Wireless LAN (WLAN) methods of short range ad-hoc communication. In this case, the CHDI server 140 may establish contact with the eyeglasses-like head-mountable client device 702 belonging to user 701 subsequent to receiving the image data, wherein establishing contact with the eyeglasses-like head-mountable client device 702 belonging to user 701 comprises identifying the eyeglasses-like head-mountable client device 702 belonging to user 701 based on one or more of the location of the eyeglasses-like head-mountable client device 702 belonging to user 701, the location of the eyeglasses-like head-mountable client device 602 belonging to user 401, or the eyeglasses-like head-mountable client device 602 belonging to user 401. In this case, establishing contact with the eyeglasses-like head-mountable client device 702 belonging to user 701 is performed by way of at least one of a short range ad-hoc communication or a local area network. The eyeglasses-like head-mountable client devices may include circuitry and components that enable such devices to locate one another based on both a geographic location of the respective devices as well as orientations of the respective devices. For example, assume that user 401, the user of eyeglasses-like head-mountable client device 602, wishes to transfer money to a particular user equipped with a particular eyeglasses-like head-mountable client device 702, the user 401 initiates the money transfer by pointing their eyeglasses-like head-mountable client device 602 towards the eyeglasses-like head-mountable client device 702 belonging to user 701. In this case, the CHDI system identifies the particular eyeglasses-like head-mountable client device 702 belonging to user 701 for initiating the payment transfer using the user expression map based on the location of such devices and the orientation information provided by the eyeglasses-like head-mountable client device 602.

To make the contactless money transfer, the user 602, equipped with their eyeglasses-like head-mountable client device 602 fixes their eye gaze on user 701 as captured by user 401's eyeglasses-like head-mountable client device 602. Additionally or alternatively, user 401's eye gaze information may also be captured by user 701's eyeglasses-like head-mountable client device 702. In this case, the CHDI sever is configured to process the image data to produce the eye gaze information which is then used in determining, using the user expression map, whether the image data is associated with a control event indicative of a directive to perform a particular transaction by determining whether the user 401 is considered to maintain eye contact on user 701 for a threshold amount of time based upon the eye gaze information. Prior to fixing user 401's gaze, in some embodiments, the payor (e.g., user 401) using their eyeglasses-like head-mountable client device 602 or smartphone logs in to the CHDI application (app). In this case, the CHDI server 140 provides the CHDI app and upon activation of the CHDI app by the smartphone, provides a login interface that facilitates scanning the user 401's eyes. The CHDI server 140 authenticates the user 401's eyes, and then redirects the CHDI app to an appropriate graphical user interface if the authentication is successful. In some embodiments and as shown in step 706, the CHDI server 140 connects to user 701's eyeglasses-like head-mountable client device 702 so that the CHDI server 140 captures and/or receives the eye gaze information of user 401. Additionally or alternatively, the CHDI server 140 may receive eye gaze information of user 401 from user 401's eyeglasses-like head-mountable client device 602. The CHDI server is then configured to access the CHDI database 150 comprising the user expression maps. In this case, access to the user expression maps stored in the CHDI database 150 enable identification of control events associated with the eye gaze information for which user 401's eyeglasses-like head-mountable client device 602 initiates the money transfer transaction. In step 707, user 401's eyeglasses-like head-mountable client device 602 processes the payment transaction and confirms payment. In some embodiments, the user 401 is able to confirm on their smartphone and/or eyeglasses-like head-mountable client device 602 that the money transfer transaction for which they are making is correct before the payment is processed.

Figure 8:
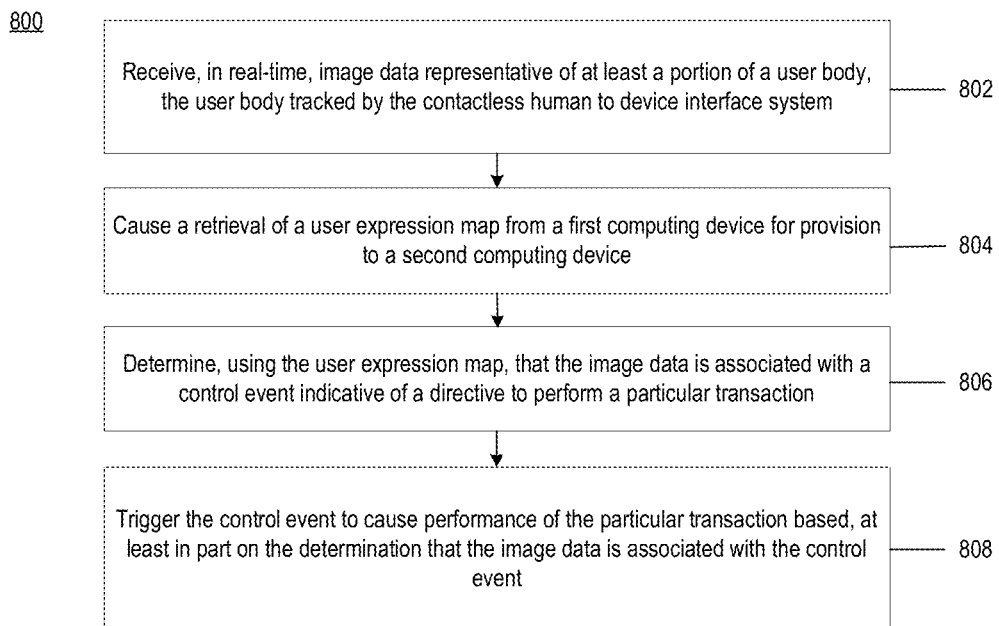
FIG. 8 is a flowchart illustrating operations performed, such as by the server of FIG. 2, to trigger a control event using a user expression map, in accordance with an example embodiment described herein.

E. Contactless Human to Device Application Usage Methodology and Exemplary Data Flows FIG. 8 illustrates various interactions between the following system components shown in FIG. 1: client devices 110A-110N, CHDI server 140, image capturing device 160, and point of sale device 170. Process 800 illustrates example operations performed by CHDI server 140 for facilitating contactless human to device payment transactions using a user expression map. At this point, the user is equipped with the CHDI app used to initiate contactless human to device payment transactions using a user expression map.

Process 800 begins with step 802 where the CHDI server is configured to receive, in real-time, image data representative of at least a portion of a user body, the user body tracked by the contactless human to device interface system. In step 804, the CHDI server causes a retrieval of a user expression map from a first computing device for provision to a second computing device. In step 806, the CHDI server is configured to determine, using the user expression map, that the image data is associated with a control event indicative of a directive to perform a particular transaction. In step 808, the CHDI server is configured to trigger the control event to cause performance of the particular transaction based, at least in part on the determination that the image data is associated with the control event.

In an embodiment, the CHDI server is configured to establish contact with the second computing device subsequent to receiving the image data, wherein establishing contact with the second computing device comprises identifying the second computing device based on one or more of the location of the second computing device, the location of the first computing device, or the orientation of the first computing device. In some embodiments, establishing contact with the second computing device is performed by way of at least one of a short range ad-hoc communication or a local area network. In some embodiments, the CHDI server is configured to process the image data to produce eye gaze information and wherein determining, using the user expression map, whether the image data is associated with a control event indicative of a directive to perform a particular transaction, the CHDI sever is further configured to determine whether a user is considered to maintain eye contact on a subject for a threshold amount of time based upon the eye gaze information.

In another embodiment, the CHDI server is configured to process the image data to produce gesture information. In such case, when determining, using the user expression map, whether the image data is associated with a control event indicative of a directive to perform a particular transaction, the CHDI server is configured to determine that an expression performed by a user or an expression performed by the user by way of the first computing device, corresponds to a predefined user expression based upon the gesture information. The CHDI server is further configured to identify at least one user authentication reference characteristic of the image data before determining, using the user expression map, whether the image data is associated with the control event indicative of the directive to perform the particular transaction. In this case, the at least one user authentication reference characteristic of the image data comprises the user's biometric data, physiological characteristics, garments, or location information.

In some embodiments, the CHDI server is configured to receive an action in response to determination that the image data is associated with the control event and cause to display, by the CHDI system, the graphical user interface that performs actuation of a visual, haptic, or audible feedback confirming execution of the control event to perform the particular transaction.

FIG. 9 illustrates various interactions between the following system components shown in FIG. 1: client devices 110A-110N, CHDI server 140, image capturing device 160, and point of sale device 170. Process 900 illustrates example operations performed by CHDI server 140 for facilitating mapping image data to a control event for use via a user expression map. At this point, the user is equipped with the CHDI app used to initiate contactless human to device payment transactions using a user expression map.

Process 900 begins with step 902 where the CHDI server is configured to receive, in real-time, image data representative of at least a portion of a user body, the user body tracked by the contactless human to device interface system. In step 904, the CHDI server is configured to cause to display, by the contactless human to device interface system, a graphical user interface that permits the user to generate a new control event to map to the image data based, at least in part on a determination that the image data is not associated with a control event. The CHDI server is then configured to generate an updated user expression map that identifies a mapping of the image data to the new control event as shown in step 906. In step 908, the CHDI server is then configured to store the updated user expression map for access by the contactless human to device interface system.

In some embodiments, the CHDI server is configured to process the image data to produce eye gaze information and wherein generating the updated user expression map that identifies a mapping of the image data to the new control event, the CHDI sever is configured to facilitate identification of user eye gaze maintenance on a subject for a threshold amount of time based upon the eye gaze information. Additionally or alternatively, the CHDI server is configured to process the image data to produce gesture information. In this case, when generating the updated user expression map that identifies a mapping of the image data to the new control event, the CHDI server is further configured to facilitate identification of an expression performed by a user or an expression performed by the user by way of the first computing device relative to one or more visual landmarks of the gesture information. In some embodiments, the CHDI server is configured to facilitate identification of at least one user authentication reference characteristic of the image data, wherein the at least one user authentication reference characteristic of the image data comprises the user's biometric data, physiological characteristics, garments, or location information and automatically map the at least one user authentication reference characteristic on the updated user expression map that identifies the mapping of the image data to the new control event. The CHDI server may then store the at least one user authentication reference characteristic such that the user interacts with the updated user expression map at a later time.

F. Contactless Human to Device Interface System Learning Mode

In some embodiments, the CHDI system may include a learning module which can reside within the processing element 205 to allow the CHDI system to recognize a particular user expression mapping, learn the mapping, and associate the physical context of the rules and control events associated with the particular mapping to that of existing mappings, rules, and control events that are defined in the user expression maps. For example, the user may frequently eat lunch at an outdoor food truck park and commonly invoke a user expression mapping comprising an "ok" gesture to initiate a payment with a 10% tip included. This particular user expression mapping also includes a rule to authenticate the user via facial recognition before making the payment. The CHDI system learns this particular user expression mapping in this context and may be configured to suggest future user expression mappings with the facial recognition authentication in the case where it is determined by the CHDI system that the user is located at the outdoor food truck park. In this case, other users performing the "ok" gesture would not trigger a payment transaction on behalf of the user. In another example, at the end of each month, the user invokes a user expression mapping to initiate a rent payment to their roommate. This particular user expression mapping is invoked when the user is physically located at their apartment and does not include any additional user authentication. The CHDI system learns this particular user expression mapping in this context and may be configured to suggest future user expression mappings bypassing user authentication in the case where it is determined by the CHDI system that the user is located at their apartment. Other factors considered by the CHDI system may involve locations, times of day, specific calendar days, the transaction recipient, the transaction payment amount, etc. In some embodiments, the CHDI system uses historical information (e.g., when certain user expression mappings are used, the context of the user and/or the user's client device 110A, times, dates, etc.) for learning user behavior for control event action programming based on the learned context. In this embodiment, the CHDI server is configured to maintain mapping histories of each of the image data to the control event mappings and analyze context and/or rules of the mapping histories to generate a learned mapping structure. In some embodiments, the CHDI server is configured to detect a current context of the user and generate, using the learned mapping structure and the current context of the user, a recommended mapping of the image data to the new control event.

CONCLUSION

FIGS. 4A, 4B, 5A, 5B, 6A, 6B, 7A, 7B, 8, and 9 illustrate flowcharts describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A contactless human to device interface system comprising:
 a user expression mapping circuitry comprising at least one processor and at least one memory, wherein the user expression mapping circuitry is configured to:
  receive, in real-time and from a first computing device, image data and additional data, the image data representative of at least a portion of a user body, the user body tracked by the contactless human to device interface system, and the additional data including a location of the first computing device and an orientation of the first computing device;
  in response to receipt of the image data, cause a retrieval of a user expression map that corresponds to a user from the first computing device;
  process the image data to produce eye gaze information;
  determine, using the user expression map and the eye gaze information, that the image data is associated with a control event indicative of a directive to perform a particular transaction based on eye contact with a subject, the control event comprising one or more rules;
  determine, by the user expression mapping circuitry and based on the one or more rules, that the first computing device is pointing at a second computing device based on the location of the first computing device and the orientation of the second computing device received in the additional data;
  identify, by the user expression mapping circuitry and based on the one or more rules, the second computing device as a recipient in the particular transaction based on determining that the first computing device is pointing at the second computing device;
  determine, by the user expression mapping circuitry and based on the one or more rules, an amount for the particular transaction based on a duration of a period of time that eye contact is maintained with the subject; and
  trigger the control event to cause performance of the particular transaction based, at least in part on the determination that the image data is associated with the control event.

2. The contactless human to device interface system of claim 1, wherein, the user expression mapping circuitry is further configured to:
 establish contact with the second computing device subsequent to receiving the image data, wherein establishing contact with the second computing device comprises identifying the second computing device based on one or more of the location of the second computing device, the location of the first computing device, or the orientation of the first computing device.

3. The contactless human to device interface system of claim 2, wherein establishing contact with the second computing device is performed by way of at least one of a short range ad-hoc communication or a local area network.

4. The contactless human to device interface system of claim 1, wherein determining, using the user expression map and the eye gaze information, whether the image data is associated with a control event indicative of a directive to perform a particular transaction comprises determining whether the user is considered to maintain eye contact on the subject for a threshold amount of time based upon the eye gaze information.

5. The contactless human to device interface system of claim 1, wherein, the user expression mapping circuitry is further configured to:
 process the image data to produce gesture information; and
 determine, using the user expression map, whether the image data is associated with another control event based on a determination that an expression performed by the user or an expression performed by the user by way of the first computing device corresponds to a predefined user expression based upon the gesture information.

6. The contactless human to device interface system of claim 1, wherein, the user expression mapping circuitry is further configured to:
 identify at least one user authentication reference characteristic of the image data before determining, using the user expression map, whether the image data is associated with the control event indicative of the directive to perform the particular transaction.

7. The contactless human to device interface system of claim 6, wherein the at least one user authentication reference characteristic of the image data comprises biometric data, physiological characteristics, garments, or location information.

8. The contactless human to device interface system of claim 1, wherein, the user expression mapping circuitry is further configured to:
 receive an action in response to determination that the image data is associated with the control event; and
 cause to display, by the contactless human to device interface system, a graphical user interface that performs actuation of a visual, haptic, or audible feedback confirming execution of the control event to perform the particular transaction.

9. A method implemented by a contactless human to device interface system, the method comprising:
 receiving, in real-time and from a first computing device, image data and additional data, the image data representative of at least a portion of a user body, the user body tracked by the contactless human to device interface system, and the additional data including a location of the first computing device and an orientation of the first computing device;
 in response to receipt of the image data, causing a retrieval of a user expression map that corresponds to a user from the first computing device;
 processing the image data to produce eye gaze information;
 determining, using the user expression map and the eye gaze information, that the image data is associated with a control event indicative of a directive to perform a particular transaction based on eye contact with a subject, the control event comprising one or more rules;
 determining, based on the one or more rules, that the first computing device is pointing at a second computing device based on the location of the first computing device and the orientation of the second computing device received in the additional data;
 identifying, based on the one or more rules, the second computing device as a recipient in the particular transaction based on determining that the first computing device is pointing at the second computing device;

determining, based on the one or more rules, an amount for the particular transaction based on a duration of a period of time that eye contact is maintained with the subject; and triggering the control event to cause performance of the particular transaction based, at least in part on the determination that the image data is associated with the control event.

10. The method of claim 9, further comprising:
establishing contact with the second computing device subsequent to receiving the image data, wherein establishing contact with the second computing device comprises identifying the second computing device based on one or more of the location of the second computing device, the location of the first computing device, or the orientation of the first computing device.

11. The method of claim 10, wherein establishing contact with the second computing device is performed by way of at least one of a short range ad-hoc communication or a local area network.

12. The method of claim 9, wherein determining, using the user expression map and the eye gaze information, whether the image data is associated with a control event indicative of a directive to perform a particular transaction comprises determining whether the user is considered to maintain eye contact on the subject for a threshold amount of time based upon the eye gaze information.

13. The method of claim 9, further comprising:
processing the image data to produce gesture information; and
determining, using the user expression map, whether the image data is associated with another control event based on a determination that an expression performed by the user or an expression performed by the user by way of the first computing device corresponds to a predefined user expression based upon the gesture information.

14. The method of claim 9, further comprising:
identifying at least one user authentication reference characteristic of the image data before determining, using the user expression map, whether the image data is associated with the control event indicative of the directive to perform the particular transaction.

15. The method of claim 14, wherein the at least one user authentication reference characteristic of the image data comprises biometric data, physiological characteristics, garments, or location information.

16. The method of claim 9, further comprising:
receiving an action in response to determination that the image data is associated with the control event; and
causing to display, by the contactless human to device interface system, a graphical user interface that performs actuation of a visual, haptic, or audible feedback confirming execution of the control event to perform the particular transaction.

17. A computer program product comprising a non-transitory computer readable medium having computer program instructions stored therein, the computer program instructions when executed by a processor, cause the processor to:

receive, in real-time and from a first computing device, image data and additional data, the image data representative of at least a portion of a user body, the user body tracked by a contactless human to device interface system, and the additional data including a location of the first computing device and an orientation of the first computing device;

in response to receipt of the image data, cause a retrieval of a user expression map that corresponds to a user from the first computing device;

process the image data to produce eye gaze information;

determine, using the user expression map and the eye gaze information, that the image data is associated with a control event indicative of a directive to perform a particular transaction based on eye contact with a subject, the control event comprising one or more rules;

determine, based on the one or more rules, that the first computing device is pointing at a second computing device based on the location of the first computing device and the orientation of the second computing device received in the additional data;

identify, based on the one or more rules, the second computing device as a recipient in the particular transaction based on determining that the first computing device is pointing at the second computing device;

determine, based on the one or more rules, an amount for the particular transaction based on a duration of a period of time that eye contact is maintained with the subject; and trigger the control event to cause performance of the particular transaction based, at least in part on the determination that the image data is associated with the control event.

18. The computer program product of claim 17, wherein the computer program instructions further cause the processor to:
establish contact with the second computing device subsequent to receiving the image data, wherein establishing contact with the second computing device comprises identifying the second computing device based on one or more of the location of the second computing device, the location of the first computing device, or the orientation of the first computing device.

19. The computer program product of claim 18, wherein establishing contact with the second computing device is performed by way of at least one of a short range ad-hoc communication or a local area network.

20. The computer program product of claim 17, wherein determining, using the user expression map and the eye gaze information, whether the image data is associated with a control event indicative of a directive to perform a particular transaction comprises determining whether the user is considered to maintain eye contact on the subject for a threshold amount of time based upon the eye gaze information.

* * * * *